US008582588B2

(12) United States Patent  (10) Patent No.: US 8,582,588 B2
Rautiola et al.  (45) Date of Patent: Nov. 12, 2013

(54) USE OF WIRELESS CIRCUIT-SWITCHED CONNECTIONS FOR TRANSFERRING INFORMATION REQUIRING REAL-TIME OPERATION OF PACKET-SWITCHED MULTIMEDIA SERVICES

(75) Inventors: Markku Rautiola, Tampere (FI); Heikki Oukka, Kempele (FI)

(73) Assignee: Intermec IP Corp., Everett, WA (US)

( * ) Notice: Subject to any disclaimer, the term of this patent is extended or adjusted under 35 U.S.C. 154(b) by 5 days.

(21) Appl. No.: 13/465,904

(22) Filed: May 7, 2012

(65) Prior Publication Data

US 2012/0281623 A1  Nov. 8, 2012

Related U.S. Application Data

(63) Continuation of application No. 12/161,253, filed as application No. PCT/FI2007/050026 on Jan. 18, 2007, now Pat. No. 8,189,604.

(30) Foreign Application Priority Data

Jan. 19, 2006  (FI) .................................... 20060044

(51) Int. Cl.
    *H04L 12/28*  (2006.01)
(52) U.S. Cl.
    USPC ............................ 370/401; 370/352; 370/338
(58) Field of Classification Search
    None
    See application file for complete search history.

(56) References Cited

U.S. PATENT DOCUMENTS

| 8,249,592 B1 * | 8/2012 | Nielsen et al. ............. 455/435.1 |
| 2002/0024943 A1 | 2/2002 | Karaul et al. |
| 2002/0062379 A1 | 5/2002 | Widegren et al. |
| 2002/0075846 A1 | 6/2002 | Valentine et al. |
| 2003/0026245 A1 | 2/2003 | Ejzak |
| 2003/0027569 A1 | 2/2003 | Ejzak |
| 2003/0027595 A1 | 2/2003 | Ejzak |
| 2003/0134638 A1 | 7/2003 | Sundar et al. |

(Continued)

FOREIGN PATENT DOCUMENTS

| EP | 1551135 A2 | 7/2005 |
| WO | 03001836 A1 | 1/2003 |
| WO | 2007082551 A1 | 7/2007 |

OTHER PUBLICATIONS

Amendment, mailed Jan. 24, 2012, for U.S. Appl. No. 12/161,253, 9 Pages.

(Continued)

*Primary Examiner* — Duc C Ho
(74) *Attorney, Agent, or Firm* — Seed IP Law Group PLLC

(57) ABSTRACT

A system includes a terminal, a wireless access network, a multimedia core network and a network device, which connects the wireless access network to the multimedia core network, expanded location updating to the registration procedure of the multimedia core network, and performs double registration of the user to the multimedia core network. The terminal performs expanded location updating relaying the registration point identity of the multimedia core network, the user's phone number and the private user identity to the network device in connection with normal location updating signaling. In the double registration performed by the network device, two addresses are registered for the user of the terminal, one of which is associated with the domain name of the terminal in question or a numeric IP address, and the other to a domain name of the network device or a numeric IP address.

21 Claims, 3 Drawing Sheets

(56) References Cited

U.S. PATENT DOCUMENTS

| | | | |
|---|---|---|---|
| 2004/0228324 | A1 | 11/2004 | Alexiou et al. |
| 2004/0246965 | A1 | 12/2004 | Westman et al. |
| 2005/0083909 | A1 | 4/2005 | Kuusinen et al. |
| 2006/0268838 | A1* | 11/2006 | Larsson et al. ............... 370/352 |
| 2006/0276193 | A1 | 12/2006 | Itzkovitz et al. |
| 2007/0238468 | A1* | 10/2007 | Buckley et al. ............... 455/445 |
| 2008/0176582 | A1* | 7/2008 | Ghai et al. ............... 455/456.2 |
| 2010/0075636 | A1 | 3/2010 | Bajko et al. |
| 2011/0009122 | A1* | 1/2011 | Kalavade ............... 455/445 |

OTHER PUBLICATIONS

Office Action, mailed Oct. 25, 2011, for U.S. Appl. No. 12/161,253, 7 Pages.

European Search Report, dated Jan. 11, 2011, 9 Pages.

International Search Report, dated Nov. 29, 2007, 2 Pages.

3GPP SA WG2: "Combining Circuit Switched (CS) and IP Multimedia Subsystem (IMS) services; Stage 2V7.1.0 (Release 7)", Internet Citation, Dec. 2005, XP002398014, Retrieved from the Internet: URL: http://www.3gpp.org/ftp/Specs/html-info/23279.htm [retrieved on Sep. 7, 2006] * the whole document*.

"Digital cellular telecommunications system (phase 2+); Universal Mobile Telecommunications System (UMTS); Numbering, addressing and identification (3GPP TS 23.003 version 6.8.0 Release 6); ETSI TS 123 003" ETSI Standards, LIS, Sophia Antipolis Cedex France, vol. 3-CN2;3-CN4, No. V6.8.0, Sep. 1, 2005, XP014032421, ISSN: 000-001 *paragraph [13.1]—paragraph [13.2]* * p. 46-p. 47 *.

* cited by examiner

USE OF WIRELESS CIRCUIT-SWITCHED CONNECTIONS FOR TRANSFERRING INFORMATION REQUIRING REAL-TIME OPERATION OF PACKET-SWITCHED MULTIMEDIA SERVICES

CROSS REFERENCE TO RELATED APPLICATIONS

This application is a continuation of U.S. patent application Ser. No. 12/161,253, filed Oct. 8, 2010, now pending, which is a U.S. national stage application filed under 35 U.S.C. §371 of International Patent Application PCT/FI2007/050026, accorded an international filing date of Jan. 18, 2007, both of which are incorporated herein by reference in their entireties.

BACKGROUND

1. Technical Field

The disclosed embodiments disclose a system and a method for using circuit-switched bearer services of public mobile phone systems for transferring information requiring real-time operation of packet-switched media services.

2. Description of the Related Art

As the wireless access network it is possible to use radio networks of public mobile phone systems, such as, for example, GSM, IS-54, IS-95, CDMA-2000 and WCDMA radio networks, as well as radio networks using unlicensed radio frequencies, such as, for example, a wireless local area network in its different forms (for example different versions of IEEE 802.11) and Bluetooth networks. The access networks can be used in both a circuit-switched mode (radio networks of public mobile phone systems) and a packet-switched mode (radio networks using unlicensed radio frequencies) for circuit-switched services (reference: UMA). UMA (Unlicensed Mobile Access) refers to a manner specified by the UMA consortium for relaying the circuit-switched signaling protocols of a public mobile phone system over a TCP/IP connection by utilizing, for example, any unlicensed radio frequency. The packet-switched multimedia service can be a generic IP telephone service according to IETF (Internet Engineering Task Force) specifications or a proprietary IP telephone service, such as Skype. It can also be a multimedia service of an IP Multimedia Subsystem (IMS) specified by 3GPP (the $3^{rd}$ Generation Partnership Project). The packet-switched multimedia service is based on combinations of audio, video, data and text, which are normally used over a packet-switched transmission path and connection also for transferring information requiring real-time operation.

A central multimedia service is an IP telephone service, which will implement, and possibly in the future also replace, conventional circuit-switched telephone services (i.e., teleservices) as well as supplementary services connected to them (i.e., call transfer, call holding/call pickup, etc.) in public mobile phone networks. However, in public mobile phone networks a General Packet Radio Service (GPRS) is not necessarily the best possible or the most cost-effective way to relay information requiring real-time operation, such as audio and video, over a wireless access network. In a core network a packet-switched transfer method based on data network protocols of prior art is a useful and cost-effective way to relay information requiring real-time operation, but for a wireless access network this is not the case, not necessarily even in access networks using unlicensed radio frequencies, when large numbers of users are involved. The packed-switched transfer method in wireless access networks of public mobile phone systems is designed especially for transferring narrow-band sound and images and it is the only way that is a verifiably functional and cost effective way to transfer real-time audio and video in a wireless manner when large numbers of users are involved. This issue is discussed in 3GPP as well, where specification work for joint use of packet-switched bearer services and IP multimedia subsystem session has been started.

Publications US 2003/0027569 A1, US 2003/0027595 A1 and US 2003/0026245 A1 disclose a system and a new entity (iMSC), by means of which the circuit-switched services of a public mobile core network can be implemented in the IP Multimedia Subsystem (IMS) specified by the 3GPP ($3^{rd}$ Generation Partnership Project). The publications disclose a new entity called iMSC, which converts the circuit-switched location updating and the voice service and feature control into SIP operations according to an IP multimedia subsystem. The publications do not directly describe how the conversion is performed, but they refer to known operation modes of a public mobile phone network and to the known operations of the elements of a public mobile phone system.

For example, the publications disclose that the iMSC performs registration of the user equipment (UE) in the IP multimedia subsystem, but they do not disclose which public user identity the iMSC registers in the IP multimedia subsystem for the user's terminal nor which address said public user identity is connected to by means of the address connection being registered. In accordance with the recommendations of the IP multimedia subsystem of 3GPP—to which the publications refer—there may be several registered public user identities and they may be in the form of a SIP resource identifier (SIP URI, Uniform Resource Identifier) or a uniform resource locator meant for a telephone number.

The above-mentioned public user identities are stored in an IP-multimedia-subsystem-specific subscriber identity module (SIM) card. If no public user identities are specified, one public user identity is derived according to the 3GPP recommendations from the International Mobile Subscriber Identity (IMSI) of the user, which is then registered in the IP multimedia subsystem. IMSI specifies the subscriber connection unambiguously, but IMSI is not a telephone number with which or to which it is possible to call from a conventional mobile phone or telephone network, and not necessarily even within the IP multimedia subsystem. In generic IP telephony networks the spectrum of public user identities is even wider, when proprietary systems, such as Skype, are also taken into account.

If now a mobile phone number is registered in the IP multimedia subsystem as the user's public address and the domain name of the iMSC as the address connection, as a person skilled in the art can assume from the operational descriptions of the publications in question and on the basis of the recommendations of 3GPP and IETF—and which is an absolute condition for the solution disclosed in the publications to even function—it still remains unclear how the address connection registered for the user is provided to the ENUM/DNS service. It is not specified in the recommendations of 3GPP or IETF either.

For the part of call control the operation of the conversion is described in FIG. 3 of the publications, where the operation of iMSC is described by two known elements 'MSC Server' and 'P-CSCF'. A person skilled in the art can, on the basis of the publications, assume that reference is made to elements specified in the 3GPP recommendations and their operation, in which case it remains unclear how the conversion is made, because neither of the above-mentioned elements supports the conversion of call control signaling in any way as such, and in the publications in question the way the conversion is made is not specified as a new operation for said elements. Elsewhere in the publications it is disclosed that the iMSC behaves like a combination of a SIP User Agent, (SIP UA) and 'P-CSCF'. Further, a person skilled in the art can, on the basis of the publications, assume that reference is made to elements specified in the 3GPP recommendations and their operation, in which case it remains unclear how, for example, the conversion of a call control signaling is made, because neither of the above-mentioned elements supports the conversion of call control signaling in any way as such according to the 3GPP recommendations, and in the publications in question the way the conversion is made is not specified as a new operation for said elements.

For the part of call control signaling a more operative combination would be, according to the 3GPP recommendations and imitating the publications in question, for example, a combination of 'MSCServer-T-SGW'-'MGCF'-'B-CSCF' or 'MSC Server'-'T-SGW'-'MGCF'. The same applies for the conversion of circuit-switched supplementary services. For the part of SIP registration the above-mentioned combination of the SIP user agent and 'P-CSCF' would be more operative from the point of view of the SIP connection procedure, if the interface between iMSC and the 'C-CSCF' entity mentioned in the publications would, in accordance with the 3GPP recommendations, be Gm. The interface between iMSC and the 'C-CSCF' entity is now specified by a new interface 'Mx'. In the publications the interface is specified as an interface using the SIP connection procedure according to the procedures of the IP multimedia subsystem, there are no other specifications for it and in the 3GPP recommendations the interface in question does not exist. In addition, the SIP user agent and 'P-CSCF' do not as such support the conversion of the location updating signaling in any way according to the 3GPP recommendations.

Further, in connection with the location updating of the mobile phone network and registration to the IP multimedia subsystem, FIG. 4 of the publications shows that the location updating to the mobile phone network is performed first and then the registration to the IP multimedia subsystem. This may lead to an unfortunate situation for the user: if the location updating to the mobile phone network is now successful, but registration to the IP multimedia subsystem fails, the result is a situation where no calls can be made with the terminal in question and no calls are received in it, because the user in question has not registered to a core network, i.e., the IP multimedia subsystem. The situation cannot be rectified until the terminal performs a periodic location updating or the user switches the terminal off and on again, in which case the registration to the IP multimedia subsystem is attempted again. In paragraph [0059] of the publication US 2003/0026245 A1, is mentioned the procedure 'inter-iMSC Location Update' of the 3GPP recommendation TS 24.008, which, however, is not specified in the recommendation in question, nor is, for example, the 'inter-MSC Location Update' procedure. The same procedure is mentioned in the other above-listed publications as well.

The publication mentions the iMSC entity performs the authentication of the user, for example, paragraphs [0057] and [0059] of US 2003/0026245 A1, which on the basis of the description in the publication is an authentication based specifically on the procedures of a conventional mobile phone network, i.e., authentication performed by the visitor location register VLR on the basis of authentication parameters received from the home location register HLR over the MAP interface, and not an authentication performed by an IP multimedia subsystem. This assumption is also supported by the description of the operation in paragraph [0098] of US 200370026245 A1 (which description of operation can be found in the other publications as well): iMSC entity sends an SIP registration request to the 'CSCF' (first to 'I-CSCF', which sends the request further to 'S-CSCF'), after which the 'CSCF's should perform authentication of the terminal through the iMSC entity by using the SIP authentication procedure of the IP multimedia subsystem and only then bring the SIP registration to a finish with 'HSS'.

Publication US 2005/0083909 discloses a system, a device and a method for establishing a circuit-switched connection by using packet-switched connection establishing signaling. The discloses system includes terminals, a multimedia network, such as the IP multimedia subsystem specified by 3GPP, and a conventional circuit-switched mobile phone network, which is not described more in detail in the publication. The publication discloses new functions for the terminals, not for any network elements.

BRIEF SUMMARY

Now the disclosed embodiments make it possible to combine two cost-effective ways that have been proven usable in practice for implementing multimedia services in wireless access networks of public mobile phone systems, i.e., a circuit-switched connection for transferring information requiring real-time operation and a packet-switched connection for controlling multimedia services. The disclosed embodiments make it possible, for example, for mobile phone service providers to implement an IP multimedia subsystem and to implement telephone services without having to invest in additional capacity of a wireless access network. In this case, the disclosed embodiments provide continuity in that it enables the joint use of circuit-switched bearer services and a session of the IP multimedia subsystem in accordance with the requirements specified by 3GPP as well. For the part of generic and proprietary IP telephone services, the disclosed embodiments make it possible to combine a mobile phone number to a generic or proprietary client of an IP telephone system, which is located and used in a mobile phone. In other words, due to the disclosed embodiments, it is possible to call a client of a generic or proprietary IP telephone system by using mobile phone numbers in the same way as in an IP multimedia subsystem.

DETAILED DESCRIPTION

Figure 1:
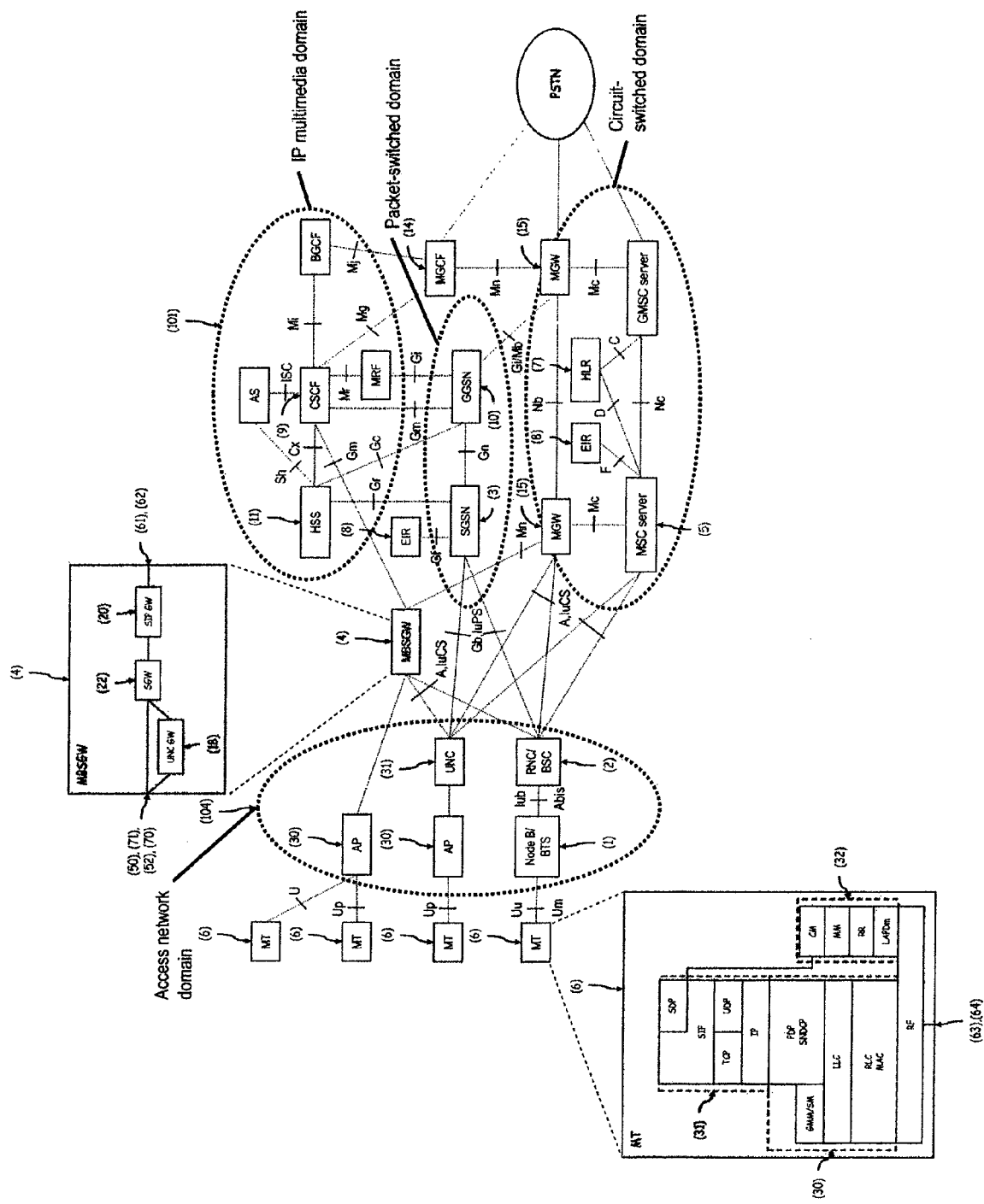
FIGS. 1A-1C show a functional block chart of an overall system utilizing the disclosed embodiments, when the IP telephone system is an IP multimedia subsystem according to 3GPP specifications.
Figure 1A:
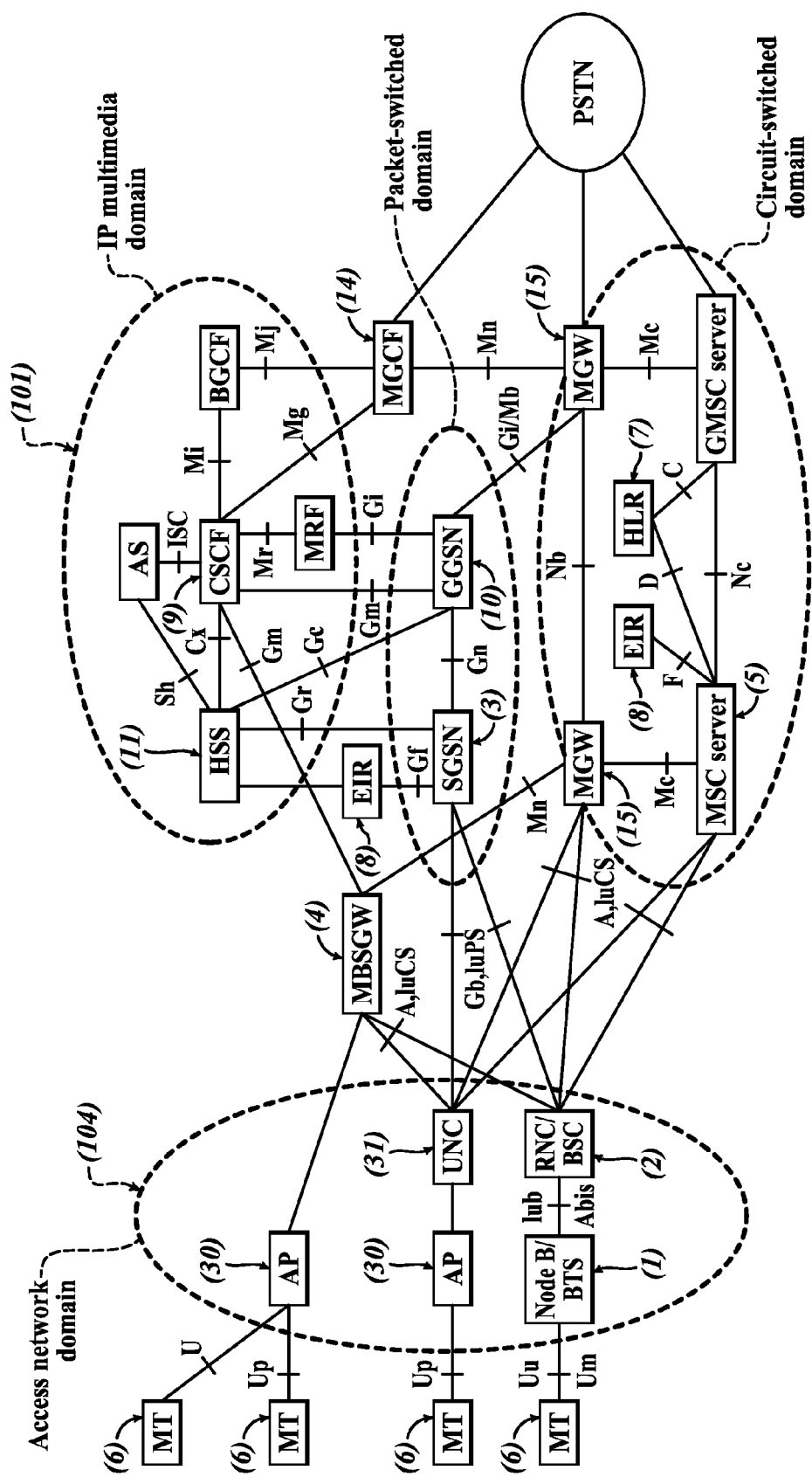
Figure 1C:
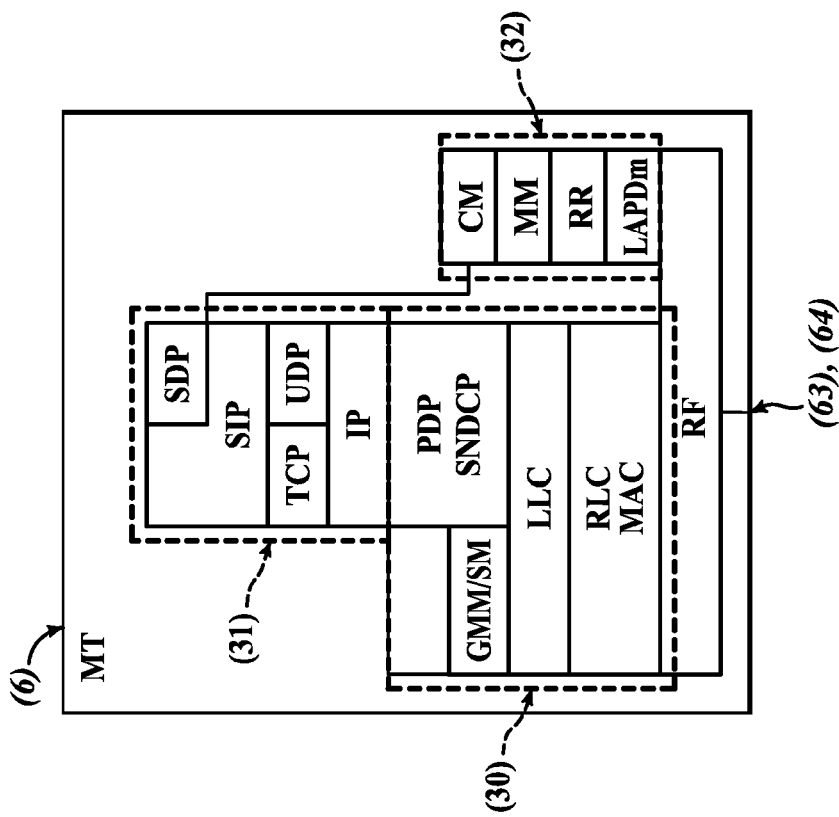
Figure 1B:
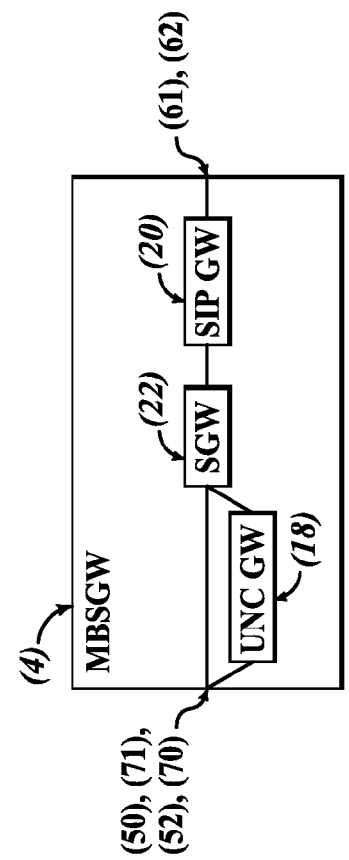

The more specific structure and operation of the overall system of FIG. 1 utilizing the invention is described with terms, interfaces and protocols known from GSM and UMTS.

In the overall system according to FIG. 1 a circuit-switched wireless access network (104) of a public mobile phone system is connected to an IP multimedia subsystem (101) via a multi bearer service gateway (MBSGW) (4). The circuit-switched wireless access network is formed by a base station (1) as well as a base station/radio network controller (2), which is called a Base Station Subsystem (BSS) in the GSM system and a Radio Network System (RNS) in the third generation UMTS system. The wireless access network (104) can also be formed by, for example, a UMA network utilizing unlicensed frequencies, which network contains wireless radio access points (AP) (30) as well as a UMA network controller (31), or it can be formed of a generic access network utilizing unlicensed frequencies, which is composed of wireless access points (30). A mobile services switching center/visitor location register server (MSC Server) (5), a home location register (HLR) (7), an equipment identity register (EIR) (8), service and gateway nodes (SGSN and GGSN) (3) and (10) of a packet radio network, as well as an IP multimedia subsystem (101), in turn, form the mobile core network. The mobile core network is divided into a circuit-switched part, which comprises the MSC Server (5) (this may naturally also be a conventional combination of a mobile services switching center and a visitor location register), a packet-switched part, which comprises service and gateway nodes (3) and (10) of a packet radio network, a location register part, which comprises the home location register (7), the visitor location register (not shown separately in FIG. 1) and the packet radio network service and gateway nodes (3) and (10), as well as an IP multimedia subsystem (101), which includes a Home Subscriber Server (HSS) (11), a Call Session Control Function (CSCF) (9) in its different functional forms (i.e., I-CSCF, P-CSCF, S-CSCF and B-CSCF), a Media Gateway Control Function (MGCF) (14), a Media Gateway (MGW) (15), as well as a Multimedia Resource Function (MRF) (16).

In the following the interfaces of the multi bearer service gateway according to the disclosed embodiments of FIG. 1 will be described more in detail.

When the wireless access network (104) of the public mobile phone system of FIG. 1 is connected via an interface A (50) or IuCS (71) to a multi bearer service gateway (4), the wireless access network (104) sees the multi bearer service gateway (4) and the IP multimedia subsystem (101) behind it as an MSC Server (5) of the public mobile phone system, i.e., as a circuit-switched part of the public mobile core network. It should be noted that, for example, the interface (50) can be either a real GSM A interface, or it can be a distributed A interface in such a manner that the lower protocols of the A interface (for example, MTP and SCCP protocols) are implemented with an SS7oIP gateway utilizing the known 'SS7 over IP' gateway technique (not shown in FIG. 1) and the upper protocols of the A interface (for example BSS-MAP and DTAP protocols) in the multi bearer service gateway (4), which also supports the above-mentioned 'SS7 over IP' gateway technique. If the base station/radio network controller (2) of the wireless access network (104) also supports the above-mentioned 'SS7 over IP' gateway technique, said SS7oIP gateway is not needed in the interfaces A (50) and IuCS (71). Said 'SS7 over IP' gateway technique is a method specified by IETF, including protocols (i.e., Sigtran protocols), for transferring SS7 signaling by utilizing the IP connection protocol. Via the interface Up (52) the terminal (6) sees the multi bearer service gateway (4) and the IP multimedia subsystem (101) behind it as a UMA network controller and as an MSC Server (5) of a public mobile phone system, i.e., as a circuit-switched part of the public mobile core network. Via the interface U (70) the terminal (6) sees the multi bearer service gateway (4) and the IP multimedia subsystem (101) behind it as an MSC Server (5) of a public mobile phone system over a TCP/IP (or the like) connection when the terminal (6) performs location updating to a public mobile phone system. It is to be noted that in this case the terminal (6) must have adequate properties to activate and perform the location updating procedure to the mobile phone system over, for example, the above-mentioned TCP/IP (or the like) connection.

Via the interface Gm (61) of FIG. 1 the session control function (9) of the IP multimedia subsystem (101) sees the multi bearer service gateway (4) as User Equipment (UE) of the IP multimedia subsystem (101), i.e., as a terminal (6) that is compatible with the IP multimedia subsystem (101), which normally communicates with the session control function (9) of the IP multimedia subsystem via the packed radio network gateway node (10). Via the interface Mn (62) the media gateway (15) sees the multi bearer service gateway (4) as a media gateway control function (14).

The multi bearer service gateway (4) according to the disclosed embodiments comprise the following functions. A UNC GW function (18) comprises a UMA radio resource protocol gateway, via which the terminal (6) equipped with UMA properties registers and communicates with the multi bearer service gateway (4) and through that with the IP multimedia subsystem (101). The multi bearer service gateway (4) does not implement the actual UMA network controller, but therefore only the UMA radio resource protocol gateway. A SIP GW function (20) comprises a SIP gateway, which implements the functions of the user equipment according to SIP specifications of 3GPP, as well the control of user identification data and the addresses-of-record of the IP multimedia subsystem (101) and the address bindings connected to sessions. A SGW function (22) is the core of the protocol routing function of the multi bearer service gateway (4). The SGW function (22) receives and relays further the location updating, registering, identification, connection, disconnection requests and responses coming from and going to different interfaces.

FIG. 1 shows the terminal (6) control protocols substantial from the point of view of the disclosed embodiments. These include GPRS protocols (30), SIP/SDP protocols (+TCP/UDP/IP) (31), as well as protocols (32) of the circuit-switched part of the core network.

In the following the interfaces of the terminal according to the disclosed embodiments of FIG. 1 will be described more in detail.

Via the interface Um (63) of FIG. 1 the base station subsystem of the GSM system sees the terminal (6) as a wireless GSM terminal, the service node (3) of the packet radio network sees the terminal (6) as a normal terminal of the packet radio network, the MSC Server (5) sees the terminal (6) as a terminal of the circuit-switched part of the core network, and the session control function (9) of the IP multimedia subsystem (101) sees the terminal (6) as user equipment of the IP multimedia subsystem (101). Via the interface Uu (64) the radio network system of the UMTS system sees the terminal (6) as a wireless UMTS terminal, the service node (3) of the packet radio network sees the terminal (6) as a normal terminal of the packet radio network, the MSC Server (5) sees the terminal (6) as a terminal of the circuit-switched part of the core network, and the session control function (9) of the IP multimedia subsystem (101) sees the terminal (6) as user equipment of the IP multimedia subsystem (101). Via the interface Up (52) the service node (3) of the packet radio network sees the terminal (6) as a normal terminal of the packet radio network, the MSC Server (5) sees the terminal (6) as a terminal of the circuit-switched part of the core network, and the session control function (9) of the IP multimedia subsystem (101) sees the terminal (6) as user equipment of the IP multimedia subsystem (101). Via the interface U (70) the multi bearer service gateway (4) sees the terminal as a terminal implemented over a TCP/IP (or the like) connection of location updating of the circuit-switched part of the service network of the mobile phone system.

In the following, the function of the system according to the disclosed embodiments in connection with registering to the multimedia core network is described more in detail. Description of the function is based on functions according to 3GPP specifications, functions differing from standard functions are mentioned separately. As the multimedia core network is disclosed a network according to the IP multimedia subsystem (101), but it can also be a generic IP voice and communication network according to IETF (Internet Engineering Task Force) specifications or a proprietary network, such as Skype.

When the terminal (6) shown in FIG. 1 sends a location updating request of the circuit-switched part of the mobile core network over the interface Um (63), Uu (64), Up (50) or U (70) to the multi bearer service gateway (4), the multi bearer service gateway (4) activates the registration according to the SIP session procedure of 3GPP to the IP multimedia subsystem (101) via the interface Gm (61). The multi bearer service gateway (4) sets the home network registrar's domain name to the Request URI (Uniform Resource Identifier) of the SIP registration request, which domain name the multi bearer service gateway (4) derives from the user's International Mobile Subscriber Identity (IMSI) from its country and network codes according to the 3GPP specifications. The multi bearer service gateway (4) receives the user's international subscriber identity from the terminal (6) in the location updating request or the multi bearer service gateway (4) requests the terminal (6) to send it in an identity response, if the user's international subscriber identity does not come with the location updating request. The multi bearer service gateway (4) can also request the home network registrar's domain name from the terminal (6) with an identity request or the terminal (6) can send it in a location updating request. This, however, requires a change in the terminals (6) functioning according to standard or a change in the standard itself, for example, in such a manner that a new, private information element for the home network registrar's domain name is specified for the location updating request, the identity request and the identity response. In the To header field of the SIP registration request the multi bearer service gateway (4) sets the registration address, which is the public user identity of the registering user presented in the form of a uniform resource locator (URL) meant for a phone number, which in this case is the international mobile phone number (mobile station ISDN, MSISDN) of the above-mentioned registering user. If the multi bearer service gateway (4) does not know the international mobile phone number of the user in question, the multi bearer service gateway (4) can request it from the terminal (6) with an identity request or the terminal (6) can send it in a location updating request. This, however, requires a change in the terminals (6) functioning according to a standard or a change in the standard itself, for example, in such a manner that a new, private mobile identity value and a new, private data structure is specified for the user's international mobile phone number in the mobile identity field of the location updating request, the identity request and the identity response. In the From header field of the SIP registration request the multi bearer service gateway (4) sets the address connection connected to the SIP session services of the user's SIP end point, which address connection follows the resource identifier structure according to the SIP session procedure, including the user's international mobile phone number as a character string+'@' character+domain name of the multi bearer service gateway (4) or its numeric IP address. In the Contact header field of the SIP registration request the multi bearer service gateway (4) relays to the IP multimedia subsystem (101) the address connection connected to the SIP session services of the user's SIP end point, which address connection the multi bearer service gateway (4) also stores in its database (or a corresponding memory). The above-mentioned address connection of the session services of the SIP end point is the same as the address connection relayed in the From header field, i.e., the user's international mobile phone number as a character string+'@' character+domain name of the multi bearer service gateway (4) or its numeric IP address. In the Username field of the Authorization header field the multi bearer service gateway (4) sets the private user identity of the user, which the multi bearer service gateway (4) derives from the user's international subscriber identity from its country and network codes according to the 3GPP specifications. The multi bearer service gateway (4) can also request the private user identity from the terminal (6) with an identity request or the terminal (6) can send it in a location updating request. This, however, requires a change in the terminals (6) functioning according to a standard or a change in the standard itself, for example, in such a manner that a new, private mobile identity value and a new, private data structure is specified for the private user identity in the mobile identity field of the location updating request, the identity request and the identity response. In the Realm field of the Authorization header field the multi bearer service gateway (4) sets an identifier of that network where the user authentication is performed. The network identifier in question is the home network registrar's domain name, which the multi bearer service gateway (4) can thus request from the terminal (6) as well with an identity request or the terminal (6) can send it in a location updating request. As already mentioned, this requires a change in the terminals functioning according to a standard or a change in the standard itself. In the Request URI field of the Authorization header field the multi bearer service gateway (4) sets the request URI of the SIP registration request. In the Security-Client header field the multi bearer service gateway (4) relays to the session control function (9) of the IP multimedia subsystem (101) those data security mechanisms, which the terminal (6) supports and which are used between the terminal (6) and the session control function (9). In this case the function differs from the mechanisms specified by 3GPP in that the data security mechanisms in question are used between the multi bearer service gateway (4) and the session control function (9) of the IP multimedia subsystem (101), and between the terminal (6) and the multi bearer service gateway (4) are used the data security mechanisms of a circuit-switched wireless access network of a public mobile phone system. The ciphering procedure used between the multi bearer service gateway (4) and the session control function (9) is IPsec-3GPP and the integrity algorithm being used is either HMAC-MD5-96 or HMAC-SHA-1-96 according to 3GPP specifications. In addition to these the multi bearer service gateway (4) relays in the other fields of the Security-Client header field the necessary parameters for creating a secure and encrypted security association between the multi bearer service gateway (4) and the IP multimedia subsystem (101), i.e., the Security Parameter Index (SPI) and the communication port numbers being used. After receiving the registration request the session control function (9) of the IP multimedia subsystem (101) starts the authentication of the user of the terminal (6) (i.e., the subscriber connection) by sending an unauthorized response to the multi bearer service gateway (4). In the WWW-Authenticate header field of the unauthorized response the session control function (9) relays a random number (RAND), an authentication token (AUTN) and the authentication algorithm to be used. In the Security-Server header field of the unauthorized response the session control function (9) relays the parameters of the ciphering procedure used between the multi bearer service gateway (4) and the session control function (9), such as the ciphering algorithm being used, the security parameter index and the communication port numbers being used. After receiving the unauthorized response the multi bearer service gateway (4) sends a corresponding authentication request to the terminal (6). In the authentication request the multi bearer service gateway (4) relays a random number and an authentication token to the terminal (6) as well as identifies the authentication algorithm to be used. After receiving the authentication request the terminal (6) picks the Message Authentication Code (MAC) and the Sequence Number (SQN) from the authentication token, calculates the Expected MAC, compares it to the authentication code of the received message and checks that the sequence number is within allowed limits. If the results are positive, the terminal (6) calculates the authentication challenge response (RES) and sends the authentication challenge response to the multi bearer service gateway (4) in its authentication request response. After receiving the authentication request response the multi bearer service gateway (4) stores the user authentication etc. data in a database (or a corresponding memory), creates an Integrity Key (IK) and security parameter index, as well as a secure and encrypted network connection and sends a new SIP registration request to the session control function (9) of the IP multimedia subsystem (101) over the secure and encrypted network connection, which is established between the multi bearer service gateway (4) and the session control function (9). The multi bearer service gateway (4) adds the private user identity and authentication challenge response to the Authorization header field. The content of the Security-Client header field is the same as in the first SIP registration request. The multi bearer service gateway (4) also adds the Security-Verify header field to the new SIP registration request in question, which contains the contents of the Security-Server header field received in the unauthorized response in an unchanged form. When the multi bearer service gateway (4) receives the OK response from the session control function (9), the registration to the IP multimedia subsystem (101) has succeeded. If the Contact header field of the received OK response now also has some other address connection than the above-mentioned registered address connection addressing the multi bearer service gateway (4) in question, which connection follows the resource identity structure according to the SIP session procedure including the user's international mobile phone number as a character string+'@' character+some domain name or a numeric IP address, i.e., the previous registration to the IP multimedia subsystem (101) via some other multi bearer service gateway, that other address connection is removed by sending a registration request to the IP multimedia subsystem (101), the expiration time of which request is 0 seconds and the Contact header field now has that other address connection. The multi bearer service gateway (4) further registers another public used identity for the same user, which is now in the form of a Uniform Resource Identifier according to SIP session procedure including the resource identifier of the international mobile phone number of the user in question in the Userinfo field and the domain name of the multi bearer service gateway (4) or its numeric IP address in the Resource Identifier Host field. The resource identifier is shown in the form 'userinfo@host', in practice the resource identifier is therefore the same as the address connection of the previous registration. The public user identity in question is set in the To header field of the new SIP registration request. Otherwise the SIP registration request is formed in the same way as above. With these two different registrations, a readiness for the joint use of circuit-switched bearer services and SIP session is created. When the multi bearer service gateway (4) receives the OK response from the session control function (9), the registration of the second public user identity to the IP multimedia subsystem (101) has succeeded, after which the multi bearer service gateway (4) sends a location updating response indicating acceptance to the terminal (6). If the Contact header field of the received new OK response now also has some other address connection than the above-mentioned registered address connection addressing the multi bearer service gateway (4) in question, which connection follows the resource identity structure according to the SIP session procedure including the user's international mobile phone number as a character string+'@' character+some domain name or a numeric IP address, that other address connection is removed by sending a registration request to the IP multimedia subsystem (101), the expiration time of which request is 0 seconds and the Contact header field now has that other address connection. If the SIP registration fails for some reason, the multi bearer service gateway (4) rejects the location updating and signals the rejection to the terminal (6). When the registration to the IP multimedia subsystem (101) has been performed via the multi bearer service gateway (4), the terminal (6) registers to the IP multimedia subsystem (101) in the normal manner specified by 3GPP over the packet radio network with one or more registration addresses, one of which is the public user identity of the registering user shown in the form of a resource locator meant for a phone number. In this case the public user identity in question is the same as the public user identity used in the first registration taking place via the multi bearer service gateway (4). The registration address is set in the To and From header fields of the registration request. In the Contact header field of the registration request the terminal (6) relays to the IP multimedia subsystem (101) its own address connection connected to SIP session services, which connection is a domain name of the terminal (6) in the form of a resource identifier or a numeric IP address, and which connection is now set as the more privileged address connection for the public user identity in question. The IP multimedia subsystem (101) authenticates the user, switches the data security mechanisms on, and accepts the registration by sending an OK response to the terminal (6). The Contact header field of the OK response now has at least two address connections for the public used identity in question, one of which is the above-mentioned terminal's (6) own address connection connected to SIP session services and one an address connection addressing the multi bearer service gateway (4).

In the following, the functions connected to phone call establishing/cancellation are described more in detail.

When the user of the terminal (6) of FIG. 1 starts an IMS call, the terminal (6) sends an SIP session request in a normal manner according to 3GPP specifications over the packet radio network to the session control function (9) of the IP multimedia subsystem (101). The SIP session request is formed in a normal manner including the message body for session media description. The session control function (9) of the IP multimedia subsystem (101) responds to the session request first with a temporary response, then with a propagation response after receiving the propagation response in question from the user equipment to be reached or from another session control function (not shown in FIG. 1). The propagation response includes the message body for media description provided by the user equipment to be reached. After this the terminal (6) starts a normal circuit-switched phone call setup, where the international mobile phone number of the user of the terminal (6) in question is set as the phone number of the user to be reached. After receiving the phone call setup request via the interface A (50), IuCS (71) or Up (52), the multi bearer service gateway (4) forms a SIP session request to be sent to the session control function (9) of the IP multimedia subsystem (101). To the request URI of the session request the multi bearer service gateway (4) sets the phone number of the user to be reached in the form of a resource locator meant for telephone numbers. The phone number of the user to be reached is received from the phone call setup request received from the terminal (6). In the To header field the multi bearer service gateway (4) sets the public user identity of the user to be reached, i.e., the registration address, which is in the form of a resource locator meant for telephone numbers and includes the phone number of the user to be reached received in the phone call setup request. In the From header field the multi bearer service gateway (4) sets the caller's phone number in the form of a resource locator meant for phone numbers, which now is the terminal (6) user's own international mobile phone number and which the multi bearer service gateway (4) receives from the phone call setup request from the terminal (6). In the Contact header field the multi bearer service gateway (4) sets the address connection connected to the session services of the caller's SIP end point, which connection it stored in connection with registration (i.e., the same as the registration address of the caller in the From header field). The session request also includes the message body for session media description. The media is described with a set of parameters, which specify, inter alia, the network type, the domain name of the caller's SIP end point, the domain name of the used media gateway, the media type, the media relay protocol, and the media coding method. The domain name of the caller's SIP end point is the domain name of the multi bearer service gateway (4) in question. The domain name of the media gateway (15) being used is received from the system configuration data. The media coding method is received from the phone call setup request received from the terminal (6). The multi bearer service gateway (4) sends a session request to the session control function (9) of the IP multimedia subsystem (101) via the interface Gm (61). After receiving the SIP session request the session control function (9) first sends a temporary response to the multi bearer service gateway (4) after which it sends the SIP session request to the terminal (6) in a normal manner over the packet radio network, because the address connection registered by the terminal (6) for the public user identity of the caller in the To header field is a privileged address connection. After receiving the SIP session request the terminal (6) responds with an OK response, which includes the selected message body for media description, which in turn includes the domain name of the SIP end point of the user to be reached with the original IMS call initiated by the terminal (6), the media relay protocol being used, the coding method, the network type, as well as the domain name of the media gateway being used in connection with the above-mentioned user to be reached. The session control function (9) relays the OK response to the multi bearer service gateway (4), from where the multi bearer service gateway (4) picks and stores the data of the message body for media description connected to the SIP end point of the user to be reached with the original IMS phone call initiated by the terminal (6) and creates a voice connection between the media gateway notified by the user to be reached in question and the media gateway (15) allocated by the multi bearer service gateway itself, after which it creates a Connect response of the circuit-switched phone call and sends it to the terminal (6). After receiving the phone call connect response from the multi radio protocol gateway (4) the terminal (6) sends an IMS phone call propagation acknowledgement (PRACK) to the session control function of the IP multimedia subsystem (101), in the message body for media description of which the terminal (6) now relays the domain name of the multi bearer service gateway (4), the relay protocol of the media being used, the coding method, the network type, and the domain name of the media gateway (15) being used. In the original IMS phone call initiated by the terminal (6) the SIP end point of the user being reached can now open a voice connection to the media gateway (15) notified by the multi bearer service gateway (4). When the SIP end point of the user to be reached with the IMS phone call sends the final OK response, the SIP session has been established between the terminal (6) and the SIP end point of the user to be reached in such a manner that voice (and image) travels between the media gateway (15) allocated by the multi bearer service gateway (4) and the media gateway allocated by the user to be reached. Between the terminal (6) and the media gateway (15) allocated by the multi bearer service gateway (4) the audio (and the video) travels in a wireless manner over the access network by using the circuit-switched bearer service specified by the SIP session. Cancellation of the connection takes place in a corresponding manner by signaling it between the IP multimedia subsystem (101) and the terminal (6) in such a manner that both the SIP session and the circuit-switched bearer service connection are cancelled normally separately. It is to be noted that the establishing of a circuit-switched bearer service, i.e., a normal circuit-switched phone call, can be made after any response according to the SIP session procedure, which response includes the data of the message body for media description connected to the SIP end point of the user to be reached with the original IMS phone call initiated by the terminal (6). In addition, the circuit-switched connection can be established so that after receiving the propagation response to the IMS phone call from the session control function (9) of the IP multimedia subsystem (101) the terminal (16) sends a SIP session request normally according to 3GPP specifications over the packet radio network to the session control function (9) of the IP multimedia subsystem (101), the To header field of which SIP session request now includes the public user identity of the terminal (6) in question, which in turn is the address connection addressing the multi bearer service gateway (4), which the terminal (6) received in connection with registration, and the From header field includes the terminal (6) user's own international mobile phone number, i.e., the registered public user identity, in the form of a resource locator meant for phone numbers. After receiving the SIP session request the session control function (9) of the IP multimedia subsystem (101) first sends a temporary response to the terminal (6), after which it sends a SIP session request to the multi bearer service gateway (5) via the interface Gm (61). In the SIP session request the terminal (6) relays to the multi bearer service gateway (4) the data of the message body for media description connected to the SIP end point of the user to be reached with the original IMS phone call initiated by the terminal (6), which data the multi bearer service gateway (4) uses for creating an audio (and video) connection to the media gateway allocated by the SIP end point in question. After receiving the SIP session request the multi bearer service gateway (4) first performs a paging procedure via the interface A (59), luCS (71) or Up (52), with which the terminal (6) is made to receive a circuit-switched phone call setup request, if the connection between the terminal (6) and the multi bearer service gateway (4) is not already active. When the terminal (6) has answered the page, the multi bearer service gate (4) relays the circuit-switched phone call setup request to the terminal (6), after which the phone call establishing is signaled between the terminal (6) and the IP multimedia subsystem (101) via the multi bearer service gateway (4). In the first SIP session request response, where the message body for media description is allowed, the multi bearer service gateway (4) relays to the terminal (6) the data of the message body for media description being used in connection with the multi bearer service gateway (4), which data the terminal (6) relays further to the SIP end point of the user to be reached with the original IMS phone call initiated by the terminal (6). This latter manner for establishing a circuit-switched connection over the wireless access network (104) is inferior in that it uses more of the resources of the wireless access network (104). The terminal (6) knows how to connect the circuit-switched connection establishing to the SIP session establishing, because the circuit-switched connection establishing is made with it to the public user identity that has (at least) two address connections, one of which is the address connection connected to the SIP session services and registered to it by the terminal (6) itself and one is the address connection addressing the multi bearer service gateway (4) in question and registered to it by the multi bearer service gateway (4). It is to be noted that both the wireless access network (104) and the terminal (6) must have the ability for the simultaneous use of circuit- and packet-switched bearer services. It is also to be noted that the session control function (9) of the IP multimedia subsystem (101) does not necessarily have to have any special knowledge or properties for the joint use of the circuit-switched bearer services and the SIP session, because in this case the session control function (9) sees the joint use as two separate SIP sessions.

The phone call can also be established from the IP multimedia subsystem (101) to the terminal (6).

When the terminal (6) of FIG. 1 receives the SIP session request from the session control function (9) of the IP multimedia subsystem (101), the terminal (6) sends a temporary response to the session control function (9). After this the terminal (6) starts a normal circuit-switched phone call setup, where the international mobile phone number of the user of the terminal (6) in question is set as the phone number of the user to be reached. The circuit-switched connection is established as described above in connection with the function connected to phone call establishing. When the circuit-switched connection has been established, the terminal (6) sends a propagation response to the session control function (9) of the IP multimedia subsystem (101), which propagation response includes a message body for media description, where the terminal (6) now relays to the SIP end point of the calling user the domain name of the multi bearer service gateway (4), the relay protocol of the media being used, the coding method, the network type, and the domain name of the media gateway (15) being used. The SIP end point of the calling user responds with a propagation acknowledgement, after which it can send an updating request (UPDATE), where it can, for example, specify the parameters of the media being used. The terminal (6) forms and sends a corresponding updating request to the multi bearer service gateway (4) which detects the new media parameters and responds with an OK response to the terminal (6), which in turn responds with an OK response to the SIP end point of the user calling via the connection control function (9) to the updating request sent by it (if such came from the SIP end point of the calling user, that is). When the user of the terminal (6) responds to the IMS phone call, the terminal (6) sends the final OK response to the session control function (9) and further to the SIP end point of the calling user, which responds by sending an acknowledgement response to the terminal (6). When the terminal (6) has received an acknowledgement response to the final OK response it has sent, the SIP session has been established between the SIP end point of the calling user and the terminal (6) and the circuit-switched connection with the terminal (6) and the multi bearer service gateway (4) (and the media gateway (15)).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a mobile radio terminal to provide communications between the mobile radio terminal and a multimedia core network via a wireless access network and a multi bearer service gateway network device, which multi bearer service gateway network device performs a double registration of the mobile radio terminal, the method comprising:

wirelessly transmitting a registration request to the multi bearer service gateway network device by the mobile radio terminal via the wireless access network;

generating by the mobile radio terminal at least one of a location updating request, an identity request, or an identity response to an identity request which includes a private information element specified for a domain name of a home registrar of a user account;

wirelessly transmitting by the mobile radio terminal via the wireless access network the at least one of the location updating request, the identity request, or the identity response which includes the specified private information element to the multi bearer service gateway network device;

receiving a request by the mobile radio terminal, the request initiated by the multi bear service gateway;

generating by the mobile radio terminal at least one of an identity request or an identity response to an identity request which includes a private mobile identity value and a private data structure specified for a private user identity associated with the user account; and wirelessly transmitting by the mobile radio terminal via the wireless access network the at least one of the identity request or the identity response which includes the private mobile identity value and the private data structure specified for the private user identity associated with the user account to the multi bearer service gateway network device.

2. The method of operation of claim 1 wherein wirelessly transmitting the at least one of the location updating request, the identity request, or the identity response includes wirelessly transmitting the location updating request which includes the specified private information element via a circuit switched wireless access network.

3. The method of operation of claim 1, further comprising:

receiving a request by the mobile radio terminal, the request initiated by the multi bear service gateway; and wherein the generating and wirelessly transmitting the at least one of the location updating request, the identity request, or the identity response which includes the private information element to the multi bearer service gateway network device is responsive to the received request.

4. The method of operation of claim 1 wherein wirelessly transmitting the at least one of the location updating request, the identity request, or the identity response includes wirelessly transmitting the location updating request which further includes a private mobile identity value and a private data structure specified for an international mobile phone number associated with the user account.

5. The method of operation of claim 4 wherein wirelessly transmitting the location updating request which further includes a private mobile identity value and a private data structure specified for an international mobile phone number associated with the user account includes transmitting the location updating request which includes a mobile subscriber integrated services digital network number (MSISDN) associated with the user account.

6. The method of operation of claim 1, further comprising:
receiving a request by the mobile radio terminal, the request initiated by the multi bear service gateway;
generating by the mobile radio terminal at least one of an identity request or an identity response to an identity request which includes a private mobile identity value and a private data structure specified for an international mobile phone numbers associated with the user account; and
wirelessly transmitting by the mobile radio terminal via the wireless access network the at least one of the identity request or the identity response which includes the private mobile identity value and a private data structure specified for an international mobile phone numbers associated with the user account to the multi bearer service gateway network device.

7. The method of operation of claim 6 wherein generating at least one of an identity request or an identity response to an identity request which includes a private mobile identity value and a private data structure specified for an international mobile phone numbers associated with the user account includes generating the at least one of the identity request or the identity response to the identity request which includes the private mobile identity value and the private data structure specified for a mobile subscriber integrated services digital network number (MSISDN) associated with the user account.

8. The method of operation of claim 1 wherein wirelessly transmitting the at least one of the location updating request, the identity request, or the identity response includes wirelessly transmitting the location updating request which further includes a private mobile identity value and a private data structure specified for a private user identity associated with the user account.

9. The method of operation of claim 8 wherein wirelessly transmitting the location updating request which further includes a private mobile identity value and a private data structure specified for a private user identity associated with the user account includes transmitting the location updating request with the private mobile identity value and the private data structure specified for an international mobile subscriber identity (IMSI) number associated with the user account.

10. The method of operation of claim 1 wherein wirelessly transmitting the at least one of the identity request or the identity response which includes the private mobile identity value and the private data structure specified for the private user identity associated with the user account includes wirelessly transmitting the at least one of the identity request or the identity response which includes the private mobile identity value and the private data structure specified for an international mobile subscriber identity (IMSI) number associated with the user account.

11. The method of operation of claim 1, further comprising:
receiving multimedia by the mobile radio terminal from a packet switched multimedia domain via a circuit switched wireless access domain.

12. A mobile radio terminal to provide communications between the mobile radio terminal and a multimedia core network via a wireless access network and a multi bearer service gateway network device, which multi bearer service gateway network device performs a double registration of the mobile radio terminal, the mobile radio terminal comprising:
a radio; and
a controller communicatively coupled to the radio and configured to:
cause the radio to wirelessly to transmit a registration request to the multi bearer service gateway network device via the wireless access network;
generate at least one of a location updating request, an identity request, or an identity response to an identity request which includes a private information element specified for a domain name of a home registrar of a user account;
cause the radio to wirelessly transmit via the wireless access network the at least one of the location updating request, the identity request, or the identity response which includes the specified private information element to the multi bearer service gateway network device; and
responsive to a received request initiated by the multi bear service gateway, the controller generates at least one of an identity request or an identity response to an identity request which includes a private mobile identity value and a private data structure specified for a private user identity associated with the user account; and causes the radio to wirelessly transmit via the wireless access network the at least one of the identity request or the identity response which includes the private mobile identity value and the private data structure specified for the private user identity associated with the user account to the multi bearer service gateway network device.

13. The mobile radio terminal of claim 12 wherein the controller causes the radio to wirelessly transmit the at least one of the location updating request, the identity request, or the identity which includes the specified private information element via a circuit switched wireless access network.

14. The mobile radio terminal of claim 12 wherein the controller generates the at least one of the location updating request, the identity request, or the identity response which includes a private mobile identity value and a private data structure specified for an international mobile phone number associated with the user account.

15. The mobile radio terminal of operation of claim 14 the international mobile phone number associated with the user account includes a mobile subscriber integrated services digital network number (MSISDN) associated with the user account.

16. The mobile radio terminal of claim 12, wherein in response to a received request initiated by the multi bear service gateway, the controller:
generates at least one of an identity request or an identity response to an identity request which includes a private mobile identity value and a private data structure specified for an international mobile phone numbers associated with the user account; and
causes the radio to wirelessly transmit via the wireless access network the at least one of the identity request or the identity response which includes the private mobile identity value and a private data structure specified for an international mobile phone numbers associated with the user account to the multi bearer service gateway network device.

17. The mobile radio terminal of claim 16 wherein the controller generates the at least one of the identity request or the identity response to the identity request to include the private mobile identity value and the private data structure specified for a mobile subscriber integrated services digital network number (MSISDN) associated with the user account.

18. The mobile radio terminal of claim 12 wherein the controller causes the radio to wirelessly transmit the at least one of the location updating request, the identity request, or the identity response which further includes a private mobile identity value and a private data structure specified for a private user identity associated with the user account.

19. The mobile radio terminal of claim 18 wherein the controller causes the radio to wirelessly transmit the location updating request which further includes a private mobile identity value and a private data structure specified for an international mobile subscriber identity (IMSI) number associated with the user account.

20. The mobile radio terminal of claim 12 wherein the controller causes the radio to wirelessly transmit the at least one of the identity request or the identity response which includes the private mobile identity value and the private data structure specified for an international mobile subscriber identity (IMSI) number associated with the user account.

21. The mobile radio terminal of claim 12 wherein the radio receives multimedia by the mobile radio terminal from a packet switched multimedia domain via a circuit switched wireless access domain.

\* \* \* \* \*